(12) United States Patent
Ito et al.

(10) Patent No.: US 7,498,082 B2
(45) Date of Patent: *Mar. 3, 2009

(54) DIELECTRIC CERAMIC COMPOSITION HAVING SPECIFIC DISPERSION OF DIFFUSION DEPTH, ELECTRONIC DEVICE, AND MULTILAYER CERAMIC CAPACITOR

(75) Inventors: Kazushige Ito, Yokohama (JP); Akira Sato, Sakae (JP); Akitoshi Yoshii, Akita-Ken (JP); Masayuki Okabe, Nikaho (JP); Atsushi Takeda, Akita (JP); Takaki Shinkawa, Nipaho (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/593,485

(22) Filed: Nov. 7, 2006

(65) Prior Publication Data

US 2007/0149382 A1    Jun. 28, 2007

(30) Foreign Application Priority Data

Nov. 9, 2005    (JP)    ............................. 2005-325256

(51) Int. Cl.
 B32B 5/16    (2006.01)
 C22C 14/00    (2006.01)
 C22C 24/00    (2006.01)
 C22C 29/12    (2006.01)

(52) U.S. Cl. ........................... 428/403; 419/19; 419/23; 428/325; 428/328; 428/330; 428/689; 428/702; 501/135; 501/137; 501/152

(58) Field of Classification Search ................ 428/403, 428/325, 328, 330, 689, 702; 419/19, 23; 501/135, 136, 137, 152
See application file for complete search history.

(56) References Cited

U.S. PATENT DOCUMENTS

| | | | | |
|---|---|---|---|---|
| 6,548,437 B2 * | 4/2003 | Sato et al. | .................... | 501/139 |
| 6,556,422 B2 * | 4/2003 | Kim et al. | ................ | 361/321.2 |
| 6,800,270 B2 | 10/2004 | Nomura et al. | | |
| 6,995,968 B2 * | 2/2006 | Ito et al. | .................. | 361/321.2 |
| 6,999,302 B2 * | 2/2006 | Ito et al. | .................. | 361/321.2 |
| 7,061,748 B2 * | 6/2006 | Ito et al. | .................. | 361/321.4 |
| 7,262,146 B2 * | 8/2007 | Ito et al. | ..................... | 501/139 |
| 2002/0013213 A1 * | 1/2002 | Sato et al. | .................... | 501/139 |
| 2002/0016247 A1 * | 2/2002 | Mizuno et al. | ................ | 501/32 |
| 2002/0016249 A1 * | 2/2002 | Saito et al. | .................. | 501/139 |

(Continued)

FOREIGN PATENT DOCUMENTS

EP    1 013 608 A1    6/2000

(Continued)

Primary Examiner—H. (Holly) T Le
(74) Attorney, Agent, or Firm—Oliff & Berridge, PLC (57) ABSTRACT

A dielectric ceramic composition including dielectric particles comprising a main ingredient phase having barium titanate as its main ingredient and a diffusion phase present at the periphery of said main ingredient phase, wherein when an average value of the depth where sub ingredient elements present at said diffusion phase diffuses from a surface of said diffusion phase toward a center of said dielectric particle is designated as an average diffusion depth, a dispersion of the average diffusion depth among the dielectric particles is, in terms of CV value, 5 to 30%. According to the present invention, an electronic device excellent in all of the dielectric constant, high temperature accelerated life, TC bias, and IR temperature dependency can be provided.

13 Claims, 3 Drawing Sheets

U.S. PATENT DOCUMENTS

| | | |
|---|---|---|
| 2003/0158032 A1 | 8/2003 | Fujikawa et al. |
| 2004/0182199 A1 | 9/2004 | Naito |

FOREIGN PATENT DOCUMENTS

| | | |
|---|---|---|
| EP | 1 094 477 A2 | 4/2001 |
| JP | 2002-311828 | 11/2000 |
| JP | 2002-060268 | 2/2002 |
| JP | A 2004-111951 | 4/2004 |
| JP | A 2004-155625 | 6/2004 |
| JP | A 2004-214539 | 7/2004 |

\* cited by examiner

DIELECTRIC CERAMIC COMPOSITION HAVING SPECIFIC DISPERSION OF DIFFUSION DEPTH, ELECTRONIC DEVICE, AND MULTILAYER CERAMIC CAPACITOR

BACKGROUND OF THE INVENTION

1. Field of the Invention

The present invention relates to a dielectric ceramic composition, electronic device, and multilayer ceramic capacitor, more specifically relates to a dielectric ceramic composition dispersing the diffusion depths of sub ingredients of dielectric particles forming the dielectric ceramic composition so as to make all of the high temperature accelerated life, IR temperature dependency, TC bias, and dielectric constant excellent.

2. Description of the Related Art

In rest recent years, electronic apparatuses have been rapidly made smaller in size and higher in performance. The electronic devices mounted in these electronic apparatuses are therefore also being required to be made smaller in size and higher in performance. As the characteristics required from multilayer ceramic capacitors, one example of an electronic device, a high dielectric constant, a long insulation resistance (IR) life, a good DC bias characteristic, and also a good temperature characteristic etc. may be mentioned.

Further, multilayer ceramic capacitors are being used not only in general electronic apparatuses, but also in engine electronic control units (ECU), crank angle sensors, antilock braking system (ABS) modules, or other various types of electronic apparatuses mounted in automobile engine compartments.

The environment in which these electronic apparatuses are used falls in the winter in cold regions to as low as −20° C. or less. Further, after engine startup, in the summer, the temperature can be expected to rise to +130° C. or more. Recently, further, the wire harnesses connecting such electronic apparatuses and the equipment they control have been slashed and the electronic apparatuses have even been set outside the vehicle, so the environment of these electronic apparatuses has become even harsher. Therefore, the capacitors used in these electronic apparatuses are required to have flat temperature characteristics in a broad temperature range. Specifically, a dielectric ceramic composition must satisfy not only the X7R characteristic of the EIA standard (−55 to 125° C., $\Delta C/C=\pm15\%$ or less), but also the X8R characteristic of the EIA standard (−55 to 150° C., $\Delta C/C=\pm15\%$ or less).

As dielectric ceramic compositions satisfying the X8R characteristic, various proposals have been made. For example, Japanese Patent Publication (A) No. 2004-214539 discloses to calculate the average value of the concentration of Ca in the crystal particles and make its range of dispersion 5% or more in terms of CV value so as to obtain a capacitor satisfying the X8R characteristic and exhibiting an excellent CR product and high temperature accelerated life.

On the other hand, to realize a good dielectric constant and a good temperature characteristic, it is considered effective to make the dielectric particles forming a dielectric ceramic composition having $BaTiO_3$ as a main ingredient a core-shell structure.

For example, Japanese Patent Publication (A) No. 2004-111951 discloses an invention making the particles size uneven and making the thickness of the shell parts of the particle different in accordance with the particle size so as to obtain an excellent dielectric constant and capacity-temperature characteristic. However, this invention only satisfies the B characteristic of the JIS standard and is insufficient in the characteristic of the capacity-temperature change at a high temperature. Further, if the particles sizes are the same, the shell parts are also the same in thicknesses.

The assignee also proposed in Japanese Patent Application No. 2004-346846 a dielectric ceramic composition forming a diffusion phase in the dielectric particles. The dielectric ceramic composition described in this Japanese Patent Application No. 2004-346846 has a main ingredient containing barium titanate, a first sub ingredient containing at least one type of oxide selected from MgO, CaO, BaO, and SrO, a second sub ingredient including silicon oxide as its main ingredient, a third sub ingredient containing at least one type of oxide selected from $V_2O_5$, $MoO_3$, and $WO_3$, a fourth sub ingredient containing an oxide of R1 (where, R1 is at least one type of element selected from Sc, Er, Tm, Yb, and Lu), a fifth sub ingredient containing $CaZrO_3$ or $CaO+ZrO_2$, a sixth sub ingredient containing an oxide of R2 (where, R2 is at least one type of element selected from Y, Dy, Ho, Tb, Gd, and Eu), and a seventh sub ingredient containing MnO. The ratios of the sub ingredients to 100 moles of the main ingredient are as follows: first sub ingredient: 0.1 to 3 moles, second sub ingredient: 2 to 10 moles, third sub ingredient: 0.01 to 0.5 mole, fourth sub ingredient: 0.5 to 7 moles (where the number of moles of the fourth sub ingredient is the ratio of R1 alone), fifth sub ingredient: 0<fifth sub ingredient≦5 moles, sixth sub ingredient: 9 moles or less (where, the number of moles of the sixth sub ingredient is the ratio of R2 alone), and seventh sub ingredient: 0.5 mole or less.

The dielectric particles forming the dielectric ceramic composition described above have a main ingredient phase and a diffusion phase. By making the thickness of the diffusion phase, that is, the diffusion depth of the sub ingredient Ca, 10 to 30% in the range of the average particle size D50 of the dielectric particles, the multilayer ceramic capacitor having dielectric layers comprised of this dielectric ceramic composition satisfies the X8R characteristic and realizes a good dielectric constant, insulation resistance (IR) life, and IR temperature dependency. However, suggestions are being sought for further improving the characteristics from other viewpoints.

SUMMARY OF THE INVENTION

An object of the present invention is to provide a dielectric ceramic composition satisfying the X7R or X8 R characteristic and achieving a high dielectric constant and good high temperature accelerated life, TC bias, and IR temperature dependency. Another object of the present invention is to provide a multilayer ceramic capacitor or other electronic device produced using this dielectric ceramic composition.

The inventors, to achieve these objects, took note of the fact that the thickness of the diffusion phase affects the dielectric constant, high temperature accelerated life, TC bias, IR temperature dependency, and other characteristics. They discovered that by dispersing the thickness of the diffusion phase, that is, the value of the diffusion depth of the sub ingredients, for each dielectric particles, a high dielectric constant and a good high temperature accelerated life, TC bias, and IR temperature dependency can be realized and thereby completed the present invention.

That is, the dielectric ceramic composition according to the present invention is a dielectric ceramic composition including dielectric particles comprising a main ingredient phase having barium titanate as its main ingredient and a diffusion phase present at the periphery of said main ingredient phase, wherein when an average value of the depth where a sub ingredient element present at said diffusion phase diffuses from a surface of said diffusion phase toward a center of said dielectric particle is designated as an average diffusion depth, a dispersion of the average diffusion depth among the dielectric particles is, in terms of CV value, 5 to 30%, preferably 6 to 25%, more preferably 10 to 20%.

The thickness of the diffusion phase (=diffusion depth of a sub ingredient in diffusion phase) affects the dielectric constant, high temperature accelerated life, TC bias, IR temperature dependency, and other characteristics. The dielectric constant becomes better the smaller the thickness of the diffusion phase, but conversely the high temperature accelerated life, TC bias, and IR temperature dependency become better the greater the thickness of the diffusion phase, i.e., these characteristics are in an even inverse relationship.

Therefore, the dispersion of the thicknesses of the diffusion phases of the dielectric particles makes it possible to improve all of the characteristics with a good balance. That is, by varying the average diffusion depths of the sub ingredient element present in the diffusion phases within the above range of CV value, a high dielectric constant and good high temperature accelerated life, TC bias, and IR temperature dependency can be realized.

Preferably, as the sub ingredient element, a rare earth is contained, more preferably at least one element selected from Sc, Er, Tm, Yb, Lu, Y, Dy, Ho, Tb, Gd, and Eu, further preferably from Er, Tm, Yb, Y, Dy, Ho, Tb, and Gd. A rare earth has a large effect of flattening the capacity-temperature characteristic and effect of improving the IR and IR life.

Preferably, as the sub ingredient element, Mg is contained.
Preferably, as the sub ingredient element, Ca is contained.
Mg and Ca have large effects in flattening the capacity-temperature characteristic.

Preferably, the diffusion phase covers the main ingredient phase as a whole. By the diffusion phase covering the entire periphery of the main ingredient phase, the IR temperature characteristic and TC bias become good.

Preferably, when calculating the average particle size of the dielectric particles forming the dielectric ceramic composition in the form of the D50, objects for calculating the CV value of the diffusion depth of the sub ingredients existing in the diffusion phase are dielectric particles exhibiting the value of the average particles size D50.

The electronic device according to the present invention has dielectric layers formed by the above dielectric ceramic composition. The electronic device is not particularly limited, but a multilayer ceramic capacitor, piezoelectric device, chip inductor, chip varistor, chip thermistor, chip resistor, or other surface mounted device (SMD) chip type electronic device may be mentioned.

The multilayer ceramic capacitor according to the present invention is comprised of dielectric layers made of the above dielectric ceramic composition and internal electrode layers alternately stacked. Further, it can satisfy the X8R characteristic and achieve a high dielectric constant and good high temperature accelerated life, TC bias, and IR temperature dependency.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
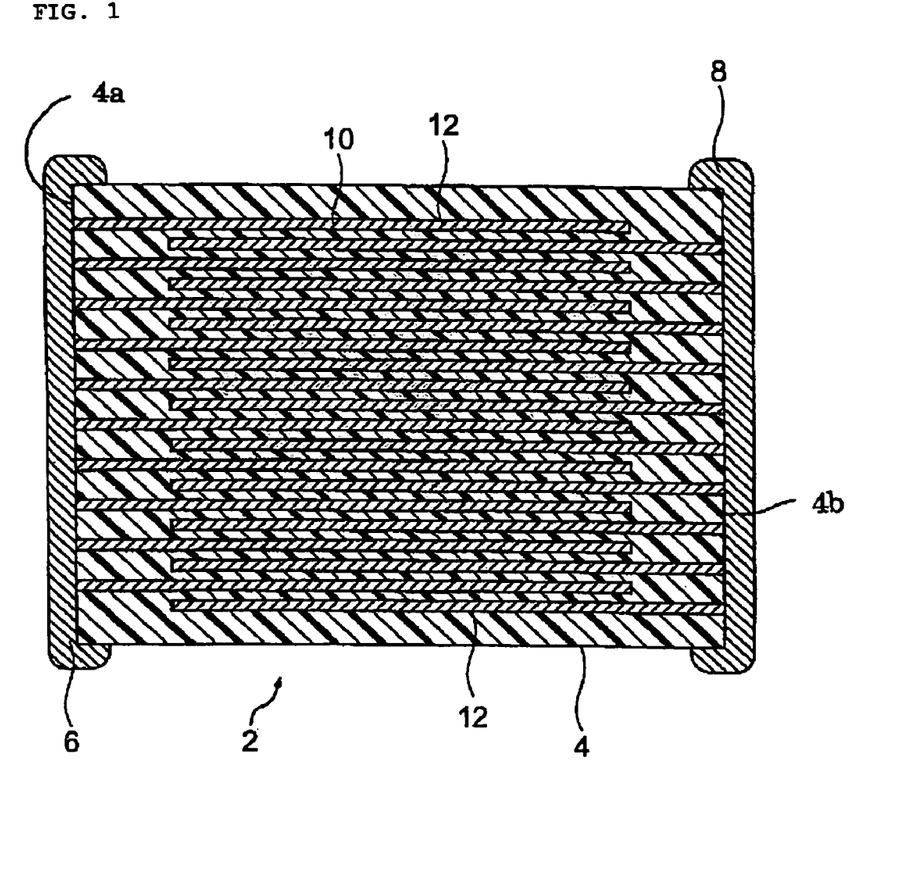
FIG. 1 is a schematic cross-sectional view of a multilayer ceramic capacitor according to an embodiment of the present invention.

As shown in FIG. 1, according to an embodiment of the present invention, the multilayer ceramic capacitor 2 has a capacitor body 4 comprised of dielectric layers 10 and internal electrode layers 12 alternately stacked. Every other internal electrode layer 12 is electrically connected to an inside of a first terminal electrode 6 formed at the outside of a first end 4a of the capacitor body 4. Further, the remaining internal electrode layers 12 are electrically connected to the inside of a second terminal electrode 8 formed at the outside of a second end 4b of the capacitor body 4.

The shape of the capacitor body 4 is not particularly limited and may be suitably selected in accordance with the objective and application, but usually is a rectangular parallelopiped. The dimensions area also not limited and may be suitably selected in accordance with the objective and application. Usually, they are a length of 0.4 to 5.6 mm, a width of 0.2 to 5.0 mm, and a height of 0.2 to 1.9 mm or so.

Dielectric Layers

The dielectric layers 10 are made from the dielectric ceramic composition of the present invention. The thickness of the dielectric layers 10 should be suitably determined in accordance with the objective and application, but is preferably 10 µm or less, more preferably 7 µm or less.

The dielectric ceramic composition forming the dielectric layers 10 is not particularly limited, but for example, the following compositions may be mentioned.

First Aspect (X8R Characteristic)

The dielectric ceramic composition according to the first aspect of the invention has a main ingredient containing barium titanate (preferably expressed by the formula $Ba_mTiO_{2+m}$, where m is $0.995 \leq m \leq 1.010$ and the ratio of Ba and Ti is $0.995 \leq Ba/Ti \leq 1.010$), a first sub ingredient containing at least one oxide selected from MgO, CaO, BaO, and SrO, a second sub ingredient containing silicon oxide as its main ingredient, a third sub ingredient containing at least one oxide selected from $V_2O_5$, $MoO_3$, and $WO_3$, a fourth sub ingredient containing an oxide of R1 (wherein R1 is at least one element selected from Sc, Er, Tm, Yb, and Lu), a fifth sub ingredient containing $CaZrO_3$ or $CaO+ZrO_2$ in accordance with need, a sixth sub ingredient containing an oxide of R2 (wherein R2 is at least one element selected from Y, Dy, Ho, Tb, Gd, and Eu) and a seventh sub ingredient containing MnO.

The ratios of the sub ingredients with respect to the main ingredient $BaTiO_3$ are, with respect to 100 moles of $BaTiO_3$, first sub ingredient: 0.1 to 3 moles,
second sub ingredient: 2 to 10 moles,
third sub ingredient: 0.01 to 0.5 mole,
fourth sub ingredient: 0.5 to 7 moles,
fifth sub ingredient: 0≦fifth sub ingredient≦5 moles,
sixth sub ingredient: 9 moles or less, and
seventh sub ingredient: 0.5 mole or less, preferably,
first sub ingredient: 0.1 to 2.5 moles,
second sub ingredient: 2.0 to 5.0 moles,
third sub ingredient: 0.1 to 0.4 mole,
fourth sub ingredient: 0.5 to 5.0 moles, fifth sub ingredient: 0.5 to 3 mole,
sixth sub ingredient: 0.5 to 9 moles, and
seventh sub ingredient: 0.01 to 0.5 mole.

Note that the ratio of the fourth sub ingredient and sixth sub ingredient are not the molar ratio of the oxide of R1 and R2, but the molar ratio of the R1 and R2 alone. That is, for example, when using a fourth sub ingredient comprised of an oxide of Yb, a ratio of the fourth sub ingredient of 1 mole means not that the ratio of $Yb_2O_3$ is 1 mole, but that the ratio of Yb is 1 mole.

By incorporating the first to seventh sub ingredient, the X8R characteristic can be satisfied. The preferably contents of the first to seventh sub ingredients and the reasons for the sane are as follows:

The first sub ingredient and (MgO, CaO, BaO, and SrO) exhibits the effect of flattening the capacity-temperature characteristic. If the first sub ingredient is too small in content, the rate of capacity-temperature change ends up becoming large. On the other hand, if the content is too large, the sinterability deteriorates. Note that the ratio of the oxides of the first sub ingredient may be any ratio.

The second sub ingredient (containing silicon oxide as main ingredient) may act as a sintering aid, but has an effect of reducing the defect rate of the initial insulation resistance when reducing the thickness of the dielectric layers. If the second sub ingredient is too small in content, the capacity-temperature characteristic deteriorates and the IR (insulation resistance) falls. On the other hand, if the content is too large, the IR life becomes insufficient and the dielectric constant ends up rapidly dropping.

The third sub ingredient ($V_2O_5$, $MoO_3$, and $WO_3$) exhibits the effect of flattening the capacity-temperature characteristics at the Curie temperature or more and the effect of improving the IR life. If the third sub ingredient is too small in content, such effects become insufficient. On the other hand, if the content is too large, the IR remarkably falls. Note that the ratio of the oxides of the third sub ingredient may be any ratio.

The fourth sub ingredient (oxide of R1) exhibits the effect of shifting the Curie temperature to the high temperature side and the effect of flattening the capacity-temperature characteristic. If the fourth sub ingredient is too small in content, such effects become insufficient and the capacity-temperature characteristic ends up deteriorating. On the other hand, if the content is too large, the sinterability tends to deteriorate. Among the fourth sub ingredients, due to its high effect of improvement of the characteristics and its inexpensive cost, an oxide of Yb is preferable.

The fifth sub ingredient ($CaZrO_3$) has the effect of shifting the Curie temperature to the high temperature side and the effect of flattening the capacity-temperature characteristic. However, if the fifth sub ingredient is too large in content, the IR accelerated life remarkably deteriorates and the capacity-temperature characteristic (X8R characteristic) ends up deteriorating.

By adjusting the contents of the fourth sub ingredient (oxide of R1) and the fifth sub ingredient ($CaZrO_3$), it is possible to flatten the capacity-temperature characteristic (X8R characteristic) and improve the high temperature accelerated life. In particular, in the above-mentioned range of numerical values, precipitation of different phases is suppressed and the structure can be made uniform. If the fourth sub ingredient is too large in content, giant needle-shaped crystals, that is, a pyrochlora phase, easily precipitates and remarkable deterioration in characteristics is observed when reducing the thickness between the dielectric layers of the multilayer ceramic capacitor. On the other hand, if the fourth sub ingredient is too small in content, the capacity-temperature characteristic can no longer be satisfied. If the fifth sub ingredient is too large in content, the capacity-temperature characteristic becomes worse and the IR accelerated life also deteriorates.

The sixth sub ingredient (oxide of R2) exhibits the effect of improving the IR and IR life and has little detrimental effect on the capacity-temperature characteristic. However, if the R2 oxide is too large in content, the sinterability tends to deteriorate. Among the sixth sub ingredients, due to the high effect in improving the characteristics and in inexpensive cost, an oxide of Y is preferable.

The seventh sub ingredient (MnO) exhibits an effect of promoting sintering, an effect of raising the IR, and an effect of improving the IR life. To sufficiently obtain such effects, the ratio of the seventh sub ingredient to 100 moles of $BaTiO_3$ is made 0.01 mole or more. However, if the seventh sub ingredient is too large in content, the capacity-temperature characteristic is detrimentally affected, so preferably the content is 0.5 mole or less.

Preferably, the second sub ingredient is expressed as at least one oxide selected from $SiO_2$, MO (where M is at least one element selected from Ba, Ca, Sr, and Mg), $Li_2O$, and $B_2O_3$.

More preferably, the sub ingredient is expressed as $(Ba,Ca)_xSiO_{2+x}$ (where x=0.7 to 1.2). The BaO and CaO in the $(Ba,Ca)_xSiO_{2+x}$ of a more preferable form of the second sub ingredient are also contained in the first sub ingredient, but the complex oxide $(Ba,Ca)_xSiO_{2+x}$ has a low melting point, so the reactivity with the main ingredient is good. Therefore, in the present invention, BaO and/or CaO are preferably added also as the complex oxide. The x in the $(Ba,Ca)_xSiO_{2+x}$ of a more preferable form of the second sub ingredient is preferably 0.7 to 1.2, more preferably 0.8 to 1.1. If x is too small, that is, if the ratio of $SiO_2$ is too large, this reacts with the main ingredient $BaTiO_3$ and causes the dielectric characteristic to deteriorate. On the other hand, if x is too large, the melting point $(Ba,Ca)_xSiO_{2+x}$ becomes high and the sinterability is degraded, so this is not preferable. Note that the ratio of Ba and Ca my be any ratio. Just one alone may also be included.

The total content of the fourth sub ingredient and sixth sub ingredient is, with respect to 100 moles of the main ingredient $BaTiO_3$, preferably 13 moles or less, further preferably 10 moles or less (however, the numbers of moles of the fourth sub ingredient and sixth sub ingredient are ratios of R1 and R2 alone). This is to maintain a good sinterability.

Second Aspect (X8R Characteristic)

The dielectric composition according to the second aspect has a main ingredient containing barium titanate (preferably expressed by the formula $Ba_mTiO_{2+m}$, where m is $0.995 \leq m \leq 1.010$ and the ratio of Ba and Ti is $0.995 \leq Ba/Ti \leq 1.010$), a first sub ingredient containing an oxide of AE (where, AE is at least one element selected from Mg, Ca, Ba, and Sr), a second sub ingredient containing an oxide of R (where, R is at least one element selected from Y, Dy, Trn. Ho, and Er), a third sub ingredient containing $M_xSiO_3$ (where M is at least one element selected from Ba, Ca, Sr, Li, and B, when M=Ba, x=1, when M=Ca, x=1, when M=Sr, x=1, when M=Li, x=2, and when M=B, x=2/3), a fourth sub ingredient containing MnO, a fifth sub ingredient containing at least one type of oxide selected from $V_2O_5$, $MoO_3$, and $WO_3$, and a sixth sub ingredient containing $CaZrO_3$ or $CaO+ZrO_2$ in accordance with need.

By incorporating the first to sixth sub ingredients, it is possible to maintain a high dielectric constant and satisfy the X8R characteristic. The preferable contents of the first to sixth sub ingredients and the reasons for the same are as follows.

The ratio of the first sub ingredient with respect to 100 moles of the main ingredient is preferably 0 to 0.1 mole (however, excluding 0 mole and 0.1 mole), preferably 0.01 to 0.1 mole (however, excluding 0.1 mole), more preferably 0.04 to 0.08 mole.

The ratio of the second sub ingredient with respect to 100 moles of the main ingredient is preferably 1 to 7 moles (however, excluding 1 mole and 7 moles), preferably 1 to 6 moles (however, excluding 1 mole), more preferably 3 to 5 moles.

The ratio of the third sub ingredient with respect to 100 moles of the main ingredient is preferably 2 to 10 moles, more preferably 2 to 6 moles.

The ratio of the fourth sub ingredient with respect to 100 moles of the main ingredient is preferably 0 to 0.5 mole (however, excluding 0 mole), more preferably 0.1 to 0.5 mole.

The ratio of the fifth sub ingredient with respect to 100 moles of the main ingredient is preferably 0.01 to 0.5 mole, more preferably 0.01 to 0.2 mole.

The ratio of the sixth sub ingredient with respect to 100 moles of the main ingredient is preferably 0 to 5 moles (however, excluding 5 moles), more preferably 0 to 3 moles.

The reasons for limitation of the contents of the sub ingredients are as follows:

If the first sub ingredient is too small in content, the capacity-temperature characteristic deteriorates overall. On the other hand, if the content of the first sub ingredient increases over the range of the present invention, capacity-temperature characteristic at the high temperature side tends to deteriorate again.

If the second sub ingredient is too small in content, the capacity-temperature characteristic ends up deteriorating. On the other hand, if the content is too large, the sinterability tends to rapidly deteriorate. In particular, by making the content of the first sub ingredient as small as possible to increasing the content of the second sub ingredient, there is the merit that the capacity-temperature characteristic can be flattened more.

If the ratio of the number of moles of the second sub ingredient to the number of moles of the first sub ingredient (second sub ingredient/first sub ingredient) is too small, the capacity-temperature characteristic ends up deteriorating and the X8R characteristic cannot be satisfied. On the other hand, if the ratio is too large, the sinterability tends to deteriorate.

Note that the ratio of the sub ingredient is not the molar ratio of the R itself, but the molar ratio of the oxide of R. That is, for example, when using a second sub ingredient comprised of an oxide of Y, a ratio of the second sub ingredient of 1 mole means not that the ratio of Y is 1 mole, but the ratio of $Y_2O_3$ is 1 mole.

If the third sub ingredient is too small in content, the capacity-temperature characteristic tends not to be able to be satisfied and the insulation resistance tends to deteriorate, in particular, the sinterability tends to remarkably worsen. On the other hand, if the content is too large, the life characteristic of the insulation resistance becomes insufficient and the dielectric constant tends to rapidly drop. Note that the ratio of the oxides in the third sub ingredient may be any ratio.

If the fourth sub ingredient is too large in content, this has a detrimental effect on the capacity-temperature characteristic and is liable to cause the IR life to deteriorate.

If the fifth sub ingredient is too small in content, the above-mentioned effect tends to become insufficient. On the other hand, if the content is too large, the IR remarkably falls. Note that the ratio of the oxides in the fifth sub ingredient may be any ratio.

If the amount of the sixth sub ingredient added is too great, the IR life remarkably falls and the capacity-temperature characteristic tends to deteriorate.

In both the first aspect and the second aspect of the invention, the form of addition of $CaZrO_3$ is not particularly limited, but CaO or another oxide including Ca, $CaCO_3$ or another carbonate, an organic compound, $CaZrO_3$, etc. may be mentioned. The ratio of Ca and Zr is not particularly limited, but should be set to an extent where they do not enter into solid solution in the main ingredient $BaTiO_3$, but the molar ratio of Ca to Zr (Ca/Zr) is preferably 0.5 to 1.5, more preferably 0.8 to 1.5, further preferably 0.9 to 1.1.

Third Aspect (X7R Characteristic)

The dielectric ceramic composition according to the third aspect has a main ingredient expressed by a formula $Ba_mTiO_{2+n}$, wherein the m in the formula is $0.995 \leq m \leq 1.010$, the n is $0.995 \leq n \leq 1.010$, and the ratio of Ba and Ti is $0.995 \leq Ba/Ti \leq 1.010$, a first sub ingredient containing at least one type of oxide selected from MgO, CaO, BaO, SrO, and $Cr_2O_3$, a second sub ingredient expressed by $(Ba,Ca)_xSiO_{2+x}$ (where, x=0.8 to 1.2), a third sub ingredient containing at least one type of oxide selected from $V_2O_5$, $MoO_3$, and $WO_3$, and a fourth sub ingredient containing an oxide of R (where, R is at least one type of element selected from Y, Dy, Tb, Gd, and Ho).

The ratios of the sub ingredients with resect to the main ingredient are, with respect to 100 moles of the main ingredient, first sub ingredient: 0.1 to 3 moles,
second sub ingredient: 2 to 12 moles,
third sub ingredient: 0.1 to 3 moles, and
fourth sub ingredient: 0.1 to 10.0 moles.

Note that the ratio of the fourth sub ingredient is not the molar ratio of the oxide of R, but the molar ratio of the R itself. That is, for example, when using a fourth sub ingredient comprised of an oxide of Y, a ratio of the fourth sub ingredient of 1 mole means not that the ratio of $Y_2O_3$ is 1 mole, but the ratio of Y is 1 mole.

The reasons for limitation of the contents of the sub ingredients are as follows:

If first sub ingredient (Mg), CaO, BaO, SrO, and $Cr_2O_3$) is too small in content, the effect of suppression of a drop in capacity under a DC bias tends to become insufficient. On the other hand, if the content is too large, the drop in the dielectric content tends to become remarkable and the accelerated life of the insulation resistance tends to become shorter. Note that the ratios of the oxides in the first sub ingredient may be any ratios.

The BaO and CaO in the second sub ingredient $(Ba,Ca)_xSiO_{2+x}$ are also included in the first sub ingredient, but the complex oxide $(Ba,Ca)_xSiO_{2+x}$ has a low melting point, so has a good reactivity with the main ingredient. Therefore, in the present invention, BaO and/or CaO are also added as the complex oxide. If the second sub ingredient is too small in content, the sinterability is poor, the accelerated life of the insulation resistance is short, and the temperature characteristic of the capacity tends not to satisfy the standard of the X7R characteristic. On the other hand, if the content is too large, the dielectric constant is low, the capacity falls, and the accelerated life of the insulation resistance also becomes short.

The x in the $(Ba,Ca)_xSiO_{2+x}$ is preferably 0.8 to 1.2, more preferably 0.9 to 1.1. If x is too small, that is, if the ratio of $SiO_2$ is too large, this reacts with the main ingredient $Ba_m$-$TiO_{2+n}$ and causes the dielectric characteristic to deteriorate. On the other hand, if x is too large, the melting point of $(Ba,Ca)_xSiO_{2+x}$ becomes higher and the sinterability is worsened, so this is not preferable. Note that in the second sub ingredient, the ratio of Ba and Ca may be any ratio. Just one alone may also be contained.

If the third sub ingredient ($V_2O_5$, $MoO_3$, and $WO_3$) is too small in content, the breakdown voltage falls and the temperature characteristic of the capacity tends not to satisfy the standard of the X7R characteristic. On the other hand, if the content is too large, the initial insulation resistance tends to become lower. Note that the ratio of the oxides in the third sub ingredient may be any ratio.

If the fourth sub ingredient (oxide of R) is too small in content, the accelerated life of the insulation resistance tends to become shorter. On the other hand, if the content is too large, the sinterability tends to deteriorate. Among the fourth sub ingredients, from the viewpoint of satisfying the X7R characteristic, an oxide of Y, an oxide of Dy, and an oxide of Ho is preferable. In particular, due to the high effect in improving the characteristics and the inexpensive cost, an oxide of Y is preferable.

Further, if necessary, MnO may be included as a fifth sub ingredient. This fifth sub ingredient exhibits the effect of promoting sintering and the effect of the dielectric loss (tan δ). To sufficiently obtain such effects, the ratio of the fifth sub ingredient with respect to 100 moles of the main ingredient is preferably 0.05 mole or more. However, if the fifth sub ingredient is too large in content, the capacity-temperature characteristic is detrimentally affected, so the content is preferably 1.0 mole or less.

Further, in addition to the above oxides, $Al_2O_3$ may also be included. $Al_2O_3$ does not effect the capacity-temperature characteristic much and exhibits the effect of improving the sinterability, insulation resistance, and the accelerated life of the insulation resistance (IR life). However, if the $Al_2O_3$ is too large in content, the sinterability becomes worse and the IR falls, so $Al_2O_3$ is preferably 4 moles or less with respect to 100 moles of the main ingredient, further preferably 4 moles or less of the dielectric ceramic composition as a whole.

Note that when at least one element of Sr, Zr, and Sn is substituted for the Ba or Ti in the main ingredient forming the perovskite structure, the Curie temperature shifts to the low temperature side, so the capacity-temperature characteristic above 125° C. becomes worse. For this reason, it is preferable not to use a $Ba_mTiO_{2+n}$ including these elements (for example (Ba, Sr(TiO_3)) as the main ingredient. However, there is no particular problem if the content is of a level contained as an impurity (0.1 mole % or so or less of dielectric ceramic composition as a whole).

Structure of Dielectric Particles

Figure 2:
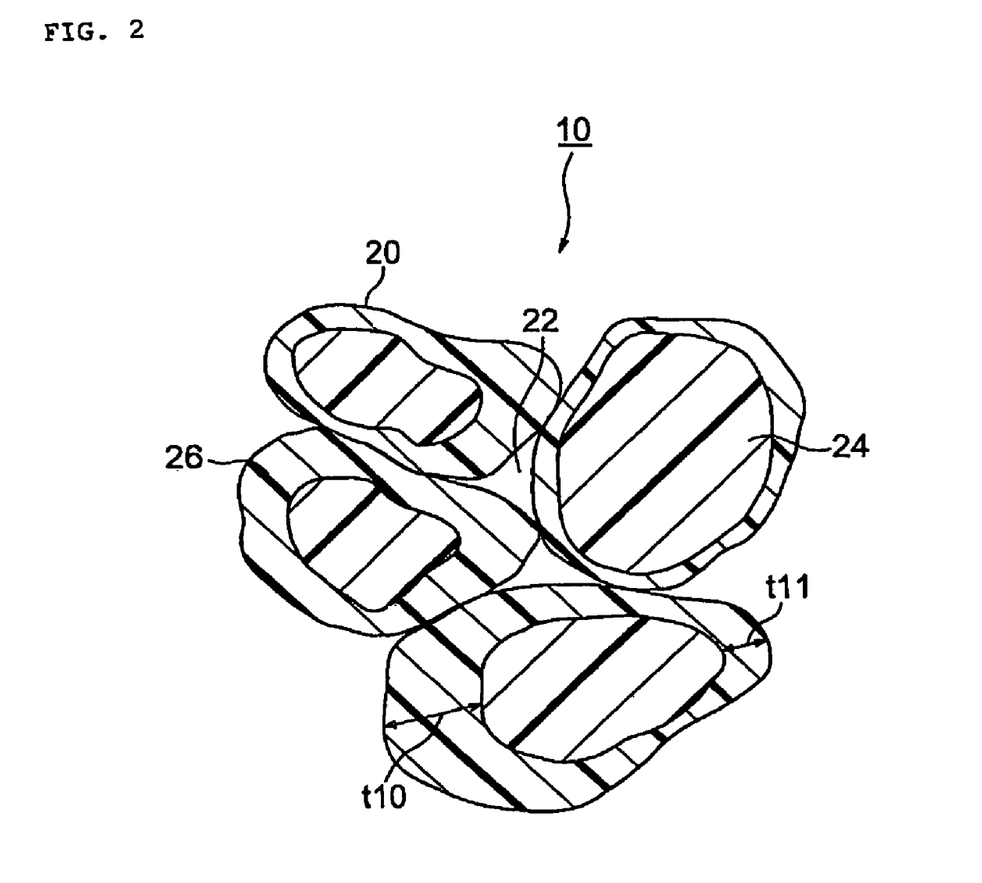
FIG. 2 is a cross-sectional view of dielectric particles forming the dielectric layers shown in FIG. 1.

The dielectric layers 10 comprised of the above dielectric ceramic composition, as shown in FIG. 2, are comprised of dielectric particles 20 and grain boundary phases 22 formed between the adjoining dielectric particles.

Each of the dielectric particles 20 has a main ingredient phase 24 and a diffusion phase 26. The main ingredient phase 24 is substantially comprised of barium titanate and exhibits a ferroelectric characteristic. Further, the diffusion phase 26 is comprised of an element added to the dielectric material as a sub ingredient diffused (entering solid solution) in the barium titanate and exhibits a paraelectric characteristic. In the present embodiment, when measuring the concentrations of the sub ingredients at the dielectric particles 20 from the surface toward the center, the region where the concentrations of the rare earth, Mg, Ca, and other specific sub ingredient elements become respectively 0.5% or less is defined the main ingredient phase.

In the present embodiment, the diffusion phase 26 covers the entire main ingredient phase 24. There may also be particles where the diffusion phase 26 does not cover the entire main ingredient phase 24, but it is preferable that the particles where the entire phase is covered account for 60% or more of the particles as a whole. By having the diffusion phase cover the entire periphery of the main ingredient phase, the IR temperature characteristic and TC bias become good.

In the present embodiment, the diffusion phase 26 contains MgO, CaO, and $R_2O_3$ (R is a rare earth element) and additionally contains oxides added as sub ingredients of the dielectric material (MnO, $V_2O_5$, etc.) Therefore, the thickness (=diffusion depth) of the diffusion phase 26 is a combination of the thicknesses of the diffusion phases of the plurality of elements (=diffusion depths of plurality of elements). In the present embodiment, the case is shown where the diffusion depth 26a of Mg, Ca, and R (R is a rare earth element) matches with the diffusion phase 26 in thickness. However, the diffusion depths of the different elements may also differ with each element.

The CV value is calculated by the method explained below. First, the diffusion depths from the surface toward the center of the dielectric particle 20 (in FIG. 2, t10 and t11) are measured. Next, the average value of t10 and t11 is found. That value is used as the average diffusion depth of that particle. A predetermined number of samples are measured in this way. The CV value=$(\sigma/x) \times 100(\%)$ is calculated from the standard deviation σ of the average diffusion depth for each particle and the average value x. The CV value is 5 to 30%, preferably 6 to 25%, more preferably 10 to 20%. In the present invention, if the CV value is too small, the dielectric constant becomes worse, while if too large, the high temperature accelerated life, the TC bias, and the IR temperature dependency deteriorate.

The dielectric particles measured for the average diffusion depth are not particularly limited, but dielectric particles exhibiting an average particle size D50 of the dielectric particles are preferably measured.

The particle size of a dielectric particle is the value obtained when slicing open a capacitor device body 4 in the stacking direction of the dielectric layers 10 and internal electrode layers 12, measuring the average area of the dielectric particles 20 in the cross-section shown in FIG. 2, calculating the circle equivalent diameter as the diameter, and multiplying this by 1.5. This is measured for at least 200 dielectric particles 20. The value where the cumulative total becomes 50% from the distribution of the cumulative total number of obtained particle sizes is defined as the average particle size D50 (unit: μm).

The D50 is not particularly limited in the present embodiment, but should be suitably determined from for example 0.1 to 3 μm in range in accordance with the thickness of the dielectric layers 10 etc. The capacity-temperature characteristic deteriorates the thinner the dielectric layers 10 and, further, tends to deteriorate the smaller the average particle size D50 of the dielectric particles. For this reason, the dielectric ceramic composition of the present invention is particularly effective when it is necessary to reduce the average particle size, specifically, when the average particle size is 0.1 to 0.5 μm. Further, if the average particle size is smaller, the IR life becomes longer and, further, there is less change in the capacity over time under a DC field, so from this viewpoint as well, a small average particle size is preferable.

Internal Electrode Layers

The conductive material included in the internal electrode layers 12 is not particularly limited, but since the material forming the dielectric layers 10 has resistance to reduction, a base metal can be used. As the base metal used as the conductive material, Ni or an Ni alloy is preferable. As the Ni alloy, an alloy of at least one element selected from Mn, Cr, Co, and Al with Ni is preferable. A content of Ni in the alloy of 95 wt % or more is preferable.

Note that the Ni or Ni alloy may also contain P and various other types of trace ingredients in amounts of 0.1 wt % or so or less.

The thickness of the internal electrode layers may be suitably set in accordance with the application etc., but usually is 0.5 to 5 μm. In particular, 0.5 to 1.5 μm or so is preferable.

Terminal Electrodes

The conductive material contained in the terminal electrodes 6 and 8 is not particularly limited, but in the present invention, the inexpensive Ni or Cu and their alloys may be used. Further, the thickness of the terminal electrode 6 and 8 may be suitably determined in accordance with the application etc., but usually 10 to 50 μm or so is preferable.

Method of Production of Multilayer Ceramic Capacitor

The multilayer ceramic capacitor using the dielectric ceramic composition of the present invention is produced in the same way as a conventional multilayer ceramic capacitor by preparing a green chip using a paste by the usual printing method or sheet method, firing this, then printing or transferring and firing terminal electrodes. Below, the method of production will be specifically explained.

First, the dielectric material powder to be contained in the dielectric layer paste is prepared and formed into a paste to prepare the dielectric layer paste. The dielectric layer paste may be an organic-based paste comprised of the dielectric material powder and an organic vehicle kneaded together or a water-based paste.

As the dielectric material powder, the above oxides or their mixtures or complex oxides may be used, but it is also possible to use, in addition to the above oxides, various types of compounds giving those oxides or complex oxides upon firing, such as carbonates, oxalates, nitrates, hydroxides, organometallic compounds, etc. selected and mixed together.

In this specification, the oxides forming the main ingredient and the sub ingredients are expressed by stoichiochemical compositions, but the oxidized states of the oxides may also deviate from the stoichiochemical compositions. The ratios of the sub ingredients are found by converting the amounts of metals contained in the oxides forming the sub ingredients to oxides of the above stoichemical compositions.

The dielectric material powder mixed in the predetermined ratio is calcined to control the CV value. A first method is to divide the dielectric material into suitable amounts, calcine them under different conditions, then mix them after calcining. A second method is to perform first calcining during which only adding part of the sub ingredient and then perform second calcining during which adding the remaining sub ingredient. With both methods, the CV value showing the variation in average diffusion depths of the different elements can be controlled. In the state before conversion into a paste, the particle size of the dielectric ceramic composition powder is usually an average particle size of 0.1 to 1.0 μm or so.

The "organic vehicle" is comprised of a binder dissolved in an organic solvent. The binder used for the organic vehicle is not particularly limited, but may be suitably selected from ethyl cellulose, polyvinyl butyral, and other usual types of binders. Further, the organic solvent used is not particularly limited, but may be suitably selected from terpineol, butyl carbitol, acetone, toluene, or other various types of organic solvents in accordance with the printing method, sheet method, or other method of use.

Further, when making the dielectric layer paste a water-based paste, it is sufficient to knead together a water-based vehicle comprised of a water-soluble binder or dispersant etc. dissolved in water and the dielectric material. The water-soluble binder used for the water-based vehicle is not particularly limited, but for example, polyvinyl alcohol, cellulose, water-soluble acrylic resin, etc. may be used.

The internal electrode layer paste is prepared by kneading a conductive material comprised of the above various types of conductive metals or alloys or various types of oxides, organometallic compounds, resinate, etc. giving the conductive material after firing with the above organic vehicle. Further, the terminal electrode paste may be prepared in the same way as the above internal electrode layer paste.

The content of the organic vehicle in the paste is not particularly limited and may be made a usual content, for example, a 1 to 5 wt % or so of a binder and 10 to 50 wt % or so of a solvent. Further, the paste may contain, in accordance with need, various types of additives selected from dispersants, plasticizers, dielectrics, insulators. The total content of these is preferably 10 wt % or less.

When using the printing method, the dielectric layer paste and internal electrode layer paste are successively printed on a PET or other substrate which is then cut into predetermined shapes. Each assembly is then peeled off from the substrate to obtain a green chip.

Further, when using the sheet method, the dielectric layer paste is used to form green sheets, an internal electrode layer paste is printed on the sheets, then the sheets are stacked to obtain a green chip.

Before firing, the green chip is treated to remove the binder. The binder removal treatment may be suitable determined in accordance with the type of the conductive material in the internal electrode layer paste.

Further, as other binder removal conditions, the rate of temperature rise is preferably 5 to 300° C./hour, the holding temperature is preferably 180 to 400° C., and the temperature holding time is preferably 10 to 100 hours. Further, the firing atmosphere is preferably the air or a reducing atmosphere. As the atmosphere gas in the reducing atmosphere, for example a mixed gas of $N_2$ and $H_2$ which is wetted is preferable.

The atmosphere of firing the green chip may be suitably selected in accordance with the type of the conductive material in the internal electrode layer paste, but when using Ni, an Ni alloy, or other base metal as the conductive material, the firing atmosphere preferably has an oxygen partial pressure of $10^{-12}$ to $10^{-8}$ atm. If the oxygen partial pressure is too low, the conductive material of the internal electrode layers sinters abnormally and the electrodes sometimes break. Further, if too high, internal electrode layers tend to be oxidized.

Further, the holding temperature of firing is preferably 1100 to 1400° C. If the holding temperature is too low, the densification becomes insufficient, while if too high, abnormal sintering of the internal electrode layers causes electrode breakage or diffusion of the material of the internal electrode layers causes the capacity-temperature characteristic to deteriorate and the dielectric ceramic composition to easily be reduced.

As other firing conditions, the rate of temperature rise is preferably 50 to 500° C./hour, the temperature holding time is preferably 0.5 to 8 hours, and the cooling rate is preferably 50 to 500° C./hour. Further, the firing atmosphere is preferably made a reducing atmosphere. As the atmosphere gas, for example, a mixed gas of $N_2$ and $H_2$ which is further wetted is preferable.

When firing in a reducing atmosphere, the capacitor device body is preferably annealed. The annealing is treatment for reoxidizing the dielectric layers. This enables the IR life to be remarkabley extended, so the reliability rises.

The oxygen partial pressure in the annealing atmosphere is preferably $10^{-7}$ to $10^{-6}$ atm. If the oxygen partial pressure is too low, reoxidation of the dielectric layers will be difficult. If too high, the internal electrode layers will tend to oxidize.

The holding temperature of the annealing is preferably 500 to 1100° C. If the annealing temperature is too low, in general, the dielectric layers will be insufficiently oxidized, so the IR will be low and, further, the IR life will easily become shortened. On the other hand, if the holding temperature of the annealing is too high, the internal electrode layers will oxidize and the capacitance will fall. Further, the internal electrode layers will end up reacting with the dielectric material and the capacity-temperature characteristic will easily deteriorate, the IR fall, and the IR life fall.

Further, as the atmosphere gas for the annealing, for example, it is preferable to use wetted $N_2$ gas etc.

In the binder removal treatment, firing, and annealing, the $N_2$ gas or mixed gas etc. may be wet by for example using a wetter. In this case, the water temperature is preferably 5 to 75° C. or so.

The binder removal treatment, firing, and annealing may be performed consecutively or performed independently. When performing these consecutively, after the binder removal treatment, it is preferable to change the atmosphere without cooling, then raise the temperature to the holding temperature of firing and perform the firing, cool, then change the atmosphere when reaching the holding temperature of the annealing and perform the annealing.

The thus obtained capacitor device body is polished at its end faces by for example barrel polishing, sand blasting, etc., and printed or transferred and fired with electrode paste to form the terminal electrodes 6, 8. The terminal electrode paste is preferably baked on, for example, in a mixed gas of $N_2$ and $H_2$ at, in the present embodiment, 600 to 800° C. for approximately 10 minutes to 1 hour. In accordance with need, the terminal electrodes 6, 8 are plated on their surfaces to form covering layers.

The thus produced multilayer ceramic capacitor of the present invention is mounted by soldering etc. on a printed circuit board etc. which is then used for various types of electronic apparatuses etc.

The multilayer ceramic capacitor of the present embodiment has a composition satisfying the X8R characteristic or X7R characteristic as explained above. The dielectric particles 20 are structured with main ingredient phases 24 covered entirely by diffusion phases 26. For example, by changing the calcining conditions, the CV value can be made a predetermined value. As shown in FIG. 2, by varying the average diffusion depth, dielectric particles with thin diffusion phases and dielectric particles with thick diffusion phases end up coexisting. Due to this, both a high dielectric constant and a good high temperature accelerated life, TC bias, and IR temperature dependency can be achieved despite having reverse relationships as characteristics.

While an embodiment of the present invention was explained above, the present invention is not limited to the above-mentioned embodiment in any way and can be modified in various ways within a scope not departing from the gist of the present invention.

For example, in the above-mentioned embodiment, the calcining conditions were changed to keep the CV value in the predetermined range, but a another method, a liquid phase using an organic salt is sometimes added. Further, as the electronic device according to the present invention, a multilayer ceramic capacitor was illustrated, but the electronic device according to the present invention is not limited to a multilayer ceramic capacitor and may be any device having dielectric layers formed by the above dielectric ceramic composition.

EXAMPLES

Below, the present invention will be explained based on more detailed examples, but the present invention is not limited to these examples.

Example 1

As the main ingredient material, $BaTiO_3$ was prepared, while as the sub ingredient materials, for MgO and MnO materials, the carbonates $MgCO_3$ and $MnCO_3$ were prepared. As the remaining sub ingredient materials, $V_2O_5$, $Y_2O_3$, $Yb_2O_3$, $CaZrO_3$, and $(Ba_{0.6}Ca_{0.4})SiO_3$ were prepared. Note that $CaZrO_3$ was produced by wet mixing $CaCO_3$ and $ZrO_2$ by a ball mill for 16 hours, drying the result, firing it at 1150° C. in the air, then wet crushing the result further by a ball mill for 24 hours. Further, the glass ingredient $(Ba_{0.6}Ca_{0.4})SiO_3$ was produced by wet mixing $BaCO_3$, and $CaCO_3$, and $SiO_2$ by a ball mill for 16 hours, drying the result, firing it at 1150° C. in the air, then wet crushing the result by a ball mill for 100 hours.

Next, these materials were weighed to give, with respect to 100 moles of $BaTiO_3$ in the composition after firing, 1 mole of MgO, 0.37 mole of MnO, 0.1 mole of $V_2O_5$, 2 moles of $Y_2O_3$, 1.75 moles of $Yb_2O_3$, 1.5 moles of $CaZrO_3$, and 3 moles of $(Ba_{0.6}Ca_{0.4})SiO_3$. In the case of each sub ingredient material, the amount weighed here become the finally added amount. The weighed materials were wet mixed by a ball mill for 16 hours. The resultant slurry was dried, then the dried powder was divided into two equal amounts which were then calcined under the following two conditions.

Conditions 1,
rate of temperature rise: 200° C./hour
holding temperature: 700° C.
holding time: 2 hours
atmosphere: air and Conditions 2,
rate of temperature rise: 200° C./hour
holding temperature: 800° C.
holding time: 2 hours
atmosphere: air.

The powders calcined under the above conditions were crushed and mixed to obtain a dielectric material. 100 parts by weight of the obtained dielectric material, 4.8 parts by weight of an acrylic resin, 100 parts by weight of ethyl acetate, 6 parts by weight of a mineral spirit, and 4 parts by weight of toluene were mixed by a ball mill to form a paste and thereby obtain a dielectric layer paste.

Next, 100 parts by weight of Ni particles with an average particle size of 0.4 μm, 40 parts by weight of an organic vehicle (8 parts by weight of ethyl cellulose dissolved in 92 parts by weight of butyl carbitol), and 10 parts by weight of butyl carbitol were kneaded by a triple roll to form a paste and thereby obtain an internal electrode layer paste.

The obtained dielectric layer paste was used to form sheets on a PET film by the doctor blade method, then was dried to form green sheets. At this time, the green sheets had a thickness of 4.5 μm. The internal electrode paste was printed over these, then the sheets were peeled off from the PET film. Next, these green sheets and protective green sheets (not printed with internal electrode layer paste) were stacked and pressed to obtain green chips.

Next, each green chip was cut to a predetermined size, treated to remove the binder, fired, and annealed under the following conditions to prepare a multilayer ceramic sintered body.

The binder removal treatment was performed under the following conditions:
rate of temperature rise: 60° C./hour,
holding temperature: 260° C.,
holding time: 8 hours,
atmosphere: air.

The firing was performed under the following conditions:
rate of temperature rise: 200° C./hour,
holding temperature: 1240° C.,
holding time: 6 hours,
oxygen partial pressure: $10^{-11}$ atm,
atmosphere: $H_2$—$N_2$—$H_2O$ gas.

The annealing was performed under the following conditions:
rate of temperature rise: 200° C./hour,
holding temperature: 1000° C.,
holding time: 2 hours,
oxygen partial pressure: $10^{-7}$ atm,
atmosphere: wetted $N_2$ gas.

Note that the atmosphere gas of firing and annealing treatment was wet using a wetter with a water temperature of 35° C.

Each thus obtained sintered body was coated on its two surfaces with In—Ga to form terminal electrodes to thereby obtain a sample of the capacitor.

Each obtained capacitor has a size of 3.2 mm×1.6 mm×0.6 mm, four dielectric layers sandwiched between internal electrode layers, a thickness of each dielectric layer (interlayer thickness) of 3.5 μm, and a thickness of each internal electrode layer of 1.0 μm.

Next, the CV value was calculated by the following method for each obtained capacitor sample.

CV Value

First, the obtained capacitor sample was sliced open perpendicular to the stacking direction and the cut surface was polished. Further, that polished surface was chemically etched, then examined by a scanning electron microscope (SEM). Using the code method and assuming the dielectric particles to be spherical in shape, 250 dielectric particles were measured for particle size. The average value of the particle size for the measured dielectric particles was defined as the average particle size D50. D50 was 0.35 μm.

Figure 3:
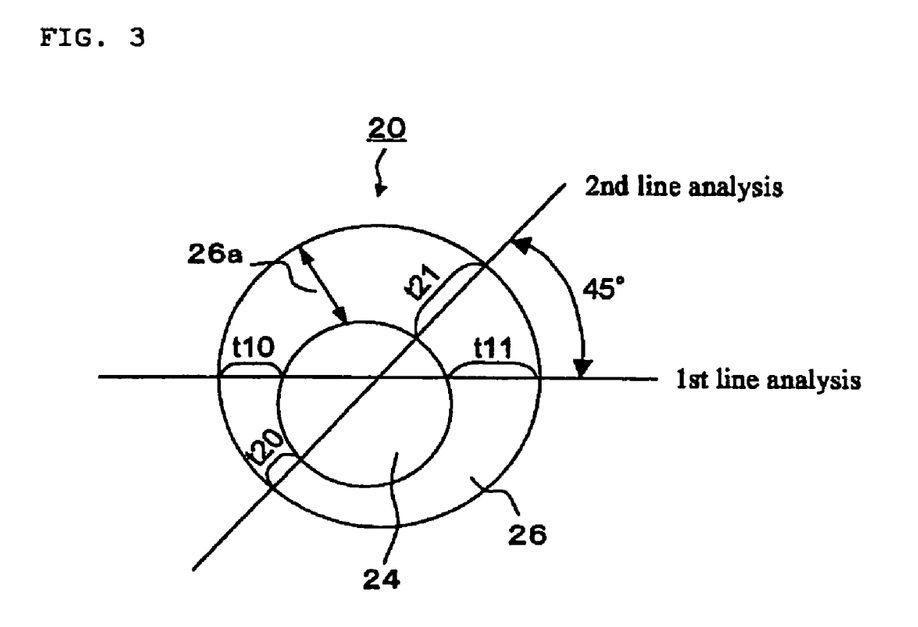
FIG. 3 is a schematic view explaining the method of calculation of the CV value in the examples.

Next, as shown in FIG. 3, for each dielectric particle exhibiting a value the same as the average particle size D50, a line was drawn connecting the two ends of the particle so as to pass through the center of the particle. An energy dispersive type X-ray spectroanalyzer attached to a transmission electron microscope (TEM) was used for line analysis along that line to measure the diffusion depth of Yb, Mg, and Ca (t10 and t11). Further, the line was shifted 45 degrees and a similar line analysis performed to measure the diffusion depths (t20 and t21).

The average value of the obtained diffusion depths was found and defined as the average diffusion depth in that particle. The CV values for the average diffusion depths of 30 particles were found. 5 to 30% is in the range of the present invention. The results are shown in Table 1.

Evaluation of Characteristics

Obtained capacitor samples were evaluated for the capacity-temperature characteristic, high temperature accelerated life, IR temperature dependency, TC bias, and dielectric constant $\in$.

For the capacity-temperature characteristic (TC), an obtained sample was measured for electrostatic capacity at −55° C. to 150° C. in temperature range. The electrostatic capacity was measured using a digital LCR meter (made by YHP, Model 4274A) under conditions of a frequency of 1 kHz and an input signal level of 1 Vrms. Further, the rate of change of the electrostatic capacity (ΔC/C., unit: %) under a temperature environment of 150° C., where the capacity-temperature characteristic deteriorated the most in the above temperature range, was calculated and it was judged if the X8R characteristic (−55 to 150° C., ΔC/C=±15% or less) was satisfied. If satisfied, "OK" was indicated, while if not satisfied, "NG" was indicated. The results are shown in Table 1.

The high temperature accelerated life (HALT) was evaluated by holding an obtained sample at 200° C. in a state with 10V/μm of DC voltage applied and measuring the average life time. In the examples, the time for the insulation resistance to drop by one order of magnitude from the start of application of the voltage was defined as the "life". This high temperature accelerated life was evaluated for 10 capacitor samples. The evaluation criteria was 10 hours or more as "good". The results are shown in Table 1.

The IR temperature dependency was evaluated by measuring an obtained sample for insulation resistance $IR_{150}$ at 150° C. and insulation resistance $IR_{25}$ at 25° C. and calculating the drop in one order of magnitude shown by the following formula 1. The evaluation criteria was −2.00 or more as "good".

$$\log(IR_{150}/IR_{25}) \quad \text{(formula 1)}$$

Note that the insulation resistance at each temperature was measured by using a variable temperature IR measuring device at a measurement voltage of 7.0V/μm and a voltage application time of 60 seconds. The results are shown in Table 1.

The TC bias was evaluated by measuring an obtained sample for electrostatic capacity by a digital LCR meter (made by YHP, Model 4274A) at 1 kHz, 1 Vrms, and 7.0V/μm bias voltage (DC voltages) while changing the temperature from −55° C. to 150° C. and calculating the rate of change of the electrostatic capacity from the value measured at 25° C. without application of a bias voltage. The evaluation criteria was −40% or more as "good". The results are shown in Table 1.

The dielectric constant $\in$ (no unit) was calculated from the electrostatic capacity measured for each capacitor sample at the reference temperature 25° C. by a digital LCR meter (made by YHP, Model 4274A) under conditions of a frequency of 1 kHz and an input signal level (measurement voltage) of 1.0 Vrms. The evaluation criteria was 1100 or more as "good". The results are shown in Table 1.

Examples 2 to 4

Except for changing the calcining conditions so as to change the CV values, the same procedure was performed as in Example 1 to prepare capacitor samples and evaluate their characteristics. The results are shown in Table 1.

Comparative Examples 1 and 2

Except for changing the calcining conditions so as to change the CV values to outside the range of the present invention, the same procedure was performed as in Example 1 to prepare capacitor samples and evaluate their characteristics. The results are shown in Table 1.

Comparative Example 3

Except for not performing the calcining, the same procedure was performed as in Example 1 to prepare a capacitor sample and evaluate the characteristics. When observing the dielectric particles according to Comparative Example 3 by a TEM, it was confirmed that in 180 out of the 200 particles examined, the main ingredient phase was not covered by the diffusion phase and was exposed. The results are shown in Table 1.

TABLE 1

| Sample No. | CV value of average diffusion depth [%] | | | Rate of change of capacity (1 V/μm) $\Delta C/C20[\%]$ | | High temp. accelerated life [hr] | TC-Bias [%] | IR temp. dependency | Dielectric constant |
|---|---|---|---|---|---|---|---|---|---|
| | Yb | Mg | Ca | 150° C. | X8R | | | | |
| Comp. Ex. 1 | 4.5 | 4.1 | 4.1 | −11.3 | OK | 28.9 | −27.5 | −1.45 | 1005 |
| Ex. 1 | 6.1 | 5.9 | 5.9 | −10.2 | OK | 23.5 | −29.3 | −1.55 | 1115 |
| Ex. 2 | 10.4 | 9.1 | 9.3 | −7.3 | OK | 21.1 | −31.1 | −1.65 | 1209 |
| Ex. 3 | 15.6 | 14.8 | 15.0 | −9.8 | OK | 17.5 | −34.1 | −1.77 | 1306 |
| Ex. 4 | 22.1 | 21.2 | 21.0 | −10.1 | OK | 12.4 | −36.7 | −1.86 | 1345 |
| Comp. Ex. 2 | 35.0 | 34.1 | 33.8 | −13.1 | OK | 1.3 | −41.3 | −2.13 | 1400 |
| Comp. Ex. 3 | Main ingredient phase exposed | | | −17.8 | NG | 0.8 | −47.8 | −2.34 | 1500 |

As shown in Table 1, when the CV values of the elements are in the range of the present invention, the X8R characteristic is satisfied and the above evaluation items are all satisfied. That is, it could be confirmed that by making the CV value the range of the present invention, the dielectric constant and the high temperature accelerated life, TC bias, and IR temperature dependency, which are in inverse relationships as characteristics, can both be achieved.

While the invention has been described with reference to specific embodiments chosen for purpose of illustration, it should be apparent that numerous modifications could be made thereto by those skilled in the art without departing from the basic concept and scope of the invention.

The invention claimed is:

1. A method of production of a dielectric ceramic composition including dielectric particles comprising steps of:
   preparing a dielectric material including:
      barium titanate as main ingredient, and
      a rare earth, Mg and Ca as a sub ingredient element;
   dividing said dielectric material into at least two;
   calcining the divided dielectric materials under different conditions;
   mixing the calcined dielectric materials; and
   firing the mixed calcined dielectric materials;
   wherein said dielectric ceramic composition comprises:
   a main ingredient phase having barium titanate as its main ingredient and
   a diffusion phase present at the periphery of said main ingredient phase, wherein
   when an average value of the depth where said subingredient element present at said diffusion phase diffuses from a surface of said diffusion phase toward a center of said dielectric particle is designated as an average diffusion depth,
   a dispersion of the average diffusion depth among the dielectric particles is, in terms of CV value, 5 to 30%.

2. The method of production of a dielectric ceramic composition as set forth in claim 1, wherein said rare earth includes at least one type of element selected from Sc, Y, Eu, Gd, Th, Dy, Ho, Er, Tm, Yb, and Lu.

3. The method of production of a dielectric ceramic composition as set forth in claim 1, wherein said diffusion phase covers said main ingredient phase as a whole.

4. The method of production of a dielectric ceramic composition as set forth in claim 1, wherein when calculating the average particle size of the dielectric particles forming the dielectric ceramic composition in the form of the D50, objects for calculating the CV value of the average diffusion depth of the sub ingredients existing in the diffusion phase are dielectric particles exhibiting the value of the average particle size D50.

5. A dielectric ceramic composition including dielectric particles obtained by a method of production comprising steps of:
   preparing a dielectric material including:
      barium titanate as main ingredient, and
      a rare earth, Mg and Ca as a sub ingredient element;
   dividing said dielectric material into at least two;
   calcining the divided dielectric materials under different conditions;
   mixing the calcined dielectric materials; and
   firing the mixed calcined dielectric materials;
   wherein said dielectric ceramic composition comprises:
   a main ingredient phase having barium titanate as its main ingredient and
   a diffusion phase present at the periphery of said main ingredient phase, wherein
   when an average value of the depth where said subingredient element present at said diffusion phase diffuses from a surface of said diffusion phase toward a center of said dielectric particle is designated as an average diffusion depth,
   a dispersion of the average diffusion depth among the dielectric particles is, in terms of CV value, 5 to 30%.

6. The dielectric ceramic composition as set forth in claim 5, wherein said rare earth includes at least one type of element selected from Sc, Y, Eu, Gd, Tb, Dy, Ho, Er, Tm, Yb, and Lu.

7. The dielectric ceramic composition as set forth in claim 5, wherein said diffusion phase covers said main ingredient phase as a whole.

8. The dielectric ceramic composition as set forth in claim 5, wherein when calculating the average particle size of the dielectric particles forming the dielectric ceramic composition in the form of the D50, objects for calculating the CV value of the average diffusion depth of the sub ingredients existing in the diffusion phase are dielectric particles exhibiting the value of the average particle size D50.

9. The dielectric ceramic composition as set forth in claim 5, wherein said divided dielectric materials are calcined under different temperatures respectively.

10. An electronic device having dielectric layers comprised of a dielectric ceramic composition as set forth in claim 5.

11. A multilayer ceramic capacitor having a capacitor body comprised of dielectric layers comprised of a dielectric ceramic composition as set forth in claim 5 and internal electrode layers alternately stacked.

12. A dielectric ceramic composition including dielectric particles, each particle comprising:

a main ingredient phase having barium titanate as a main ingredient, and a diffusion phase having a rare earth, Mg and Ca as a subingredient present at the periphery of said main ingredient phase, wherein when an average value of the depth where said subingredient diffuses from a surface of said diffusion phase toward a center of said dielectric particle is designated as an average diffusion depth, a dispersion of the average diffusion depth among the dielectric particles is, in terms of CV value, 5 to 30%, and the number of particles in which the diffusion phase covers the entire periphery of the main ingredient phase is 60% or more of the total number of particles in the composition.

13. The dielectric ceramic composition as set forth in claim 12, wherein the number of particles in which the diffusion phase covers the entire periphery of the main ingredient phase of each of the particles in the composition.

* * * * *